United States Patent Office 3,183,236
Patented May 11, 1965

3,183,236
PREPARATION OF N-ALKANOXY
AMMONIUM HALIDES
Denys Cook and Stephen Joseph Kuhn, Sarnia, Ontario, Canada, assignors to The Dow Chemical Company, Midland, Mich., a corporation of Delaware
No Drawing. Filed Feb. 12, 1962, Ser. No. 172,819
6 Claims. (Cl. 260—294.8)

The present invention relates to a novel class of organic compounds and more particularly relates to a method of preparation and to a novel class of organic compounds having the formula $$Z^+ \overset{X^-}{-} O-A \qquad (I)$$

wherein Z represents an ammonium radical having one of the formulas

A represents a radical having one of the formulas

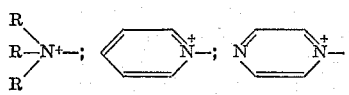

wherein R represents an alkyl radical having from 1 to 5 carbon atoms, R' represents an organic radical the residue of an acyl or sulfonyl halide, and X represents a halogen having an atomic number from 17 to 35, inclusive. These compounds have been found useful having insecticidal and bactericidal properties.

The novel compounds can be prepared by reacting a tertiary amine oxide having one of the formulas

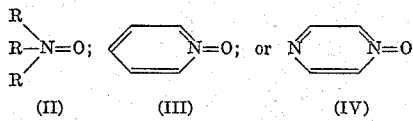

with an organic compound having one of the formulas

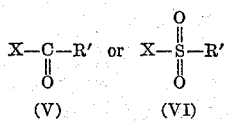

wherein each of the symbols R, and R', have the significance aforesaid, in the presence of an inert solvent for the reactants but which is a non-solvent for the products, at a temperature from about −10° C. to about 40° C. The insoluble product can be recovered in conventional manner such as filtration.

The tertiary amine oxides which can be employed in accordance with the present invention are those having the general Formulas II, III or IV. Some of such compounds are, pyridine N-oxide, 4-picoline N-oxide, quinoline N-oxides, acridine N-oxides, pyrazine N-oxide, trimethylamine N-oxide, triethylamine N-oxide, tripropylamine N-oxide, tributylamine N-oxide, tripentylamine N-oxide, their isomers and the like.

The carbonyl chlorides which can be employed in accordance with the present invention are those having the general Formula V, the aliphatic acyl chlorides, the arylacyl chlorides, their halo analogs, and the like such as acetyl chloride, propionyl chloride, butyryl chloride, valeryl chloride, benzoyl chloride, phenacetyl chloride and the like; as well as the diphenyl alkanoyl chlorides, and the N,N-diphenyl carbamoyl chloride.

The sulfonyl chlorides, which can be employed are those having the general Formula VI, benzene sulfonyl chloride, naphthalene sulfonyl chloride, butyl sulfonyl chloride and the like.

The following examples are illustrative of the present invention but are not to be construed as limiting.

Example 1

10.9 grams (0.1 mol) 4-picoline-N-oxide was dissolved in about 400 ml. acetone. 23.2 grams (0.1 mol) N,N-diphenyl carbamoyl chloride was dissolved in about 500 ml. diethyl ether. On mixing the two solutions a white precipitate developed slowly, which was filtered and washed with ether. 32.5 grams N′(N,N-diphenyl carbamoxy)-4-methyl pyridinium chloride (M.P. 123/124° C. dec.) were obtained in 95 percent yield, as a white crystalline solid. After long exposure to light it discolored to a light green-brown.

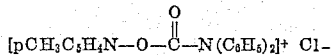

Example 2

9.5 grams (0.1 mol) of pyridine-N-oxide dissolved in 200 ml. acetone and 300 ml. diethyl ether added. 12.3 grams (0.1 mol) acetyl bromide added slowly to the cooled solution of the N-oxide (0° C.). The white precipitate was filtered and washed taking precautions to exclude atmospheric moisture. Almost quantitative yield of N-acetoxy pyridinium bromide resulted.

Example 3

In the manner of Example 2 substituting benzene sulfonyl chloride for acetyl bromide there was obtained 1-phenyl sulfonyloxy) pyridinium chloride having the formula

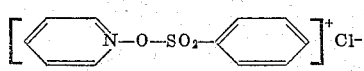

The novel compounds of the present invention have been tested and found to be useful as the sole active ingredients in insecticidal and bactericidal compositions. In representative operations 0.05 percent by weight of 1-(diphenylcarbamoloxy) pyridinium chloride gave 100 percent kill of Staphyloccocus aureus, Aspergillus terreus, Pullularia pullulans, and Rhizopus nigricans, when applied to a dextrose-nutrient agar inoculated with colonies of the named organisms. Representative of the insecticidal properties was the 100 percent kill of southern army worm when sprayed on infested plants to the point of run off as aqueous solutions containing 500 parts of toxicant per million parts of water.

We claim:
1. A compound having the formula

$$Z^+ \overset{X^-}{-} O-A$$

wherein Z represents an ammonium radical selected from the group consisting of

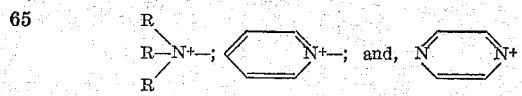

A represents a radical selected from the group consisting of

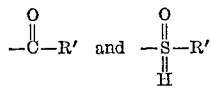

wherein R represents alkyl having from 1 to 5 carbon atoms, R' represents a member selected from the group consisting of alkyl, phenyl, phenylalkyl, diphenyl, and N,N-diphenyl amino, and having no more than 12 carbon atoms, and X represents a halogen having an atomic number from 17 to 35.

2. N'(N,N-diphenyl carbamoxy) pyridinium chloride.
3. N(benzenesulfoxy) pyridinium chloride.
4. N'(N,N-diphenyl carbamoxy)-4-methyl pyridinium chloride.
5. N-acetoxy pyridinium bromide.
6. N-(3,4-dichlorobenzoxy) pyridinium chloride.

References Cited by the Examiner

Klingsberg: "Pyridine and Its Derivatives," Part II, pp. 125–8 (Interscience) (1961).
Culvenor: "Reviews of Pure and Applied Chemistry," vol. 3, No. 2, pp. 105–109 (1953).
Krohnke et al.: "Ber.," vol. 70B, pp. 864–78 (1937).
Babcock et al.: J.A.C.S., vol. 55, pp. 2949–8 (1933).
Doering et al.: J.A.C.S., vol 73, pp. 2104–9 (195 ).
Klages et al.: "Annalen," vol. 607, pp. 35–45 (1957).
"Chemical Abstracts," Decennial Index, 1917–1926, p. 5602.

IRVING MARCUS, *Primary Examiner.*

D. T. McCUTCHEN, NICHOLAS S. RIZZO, WALTER A. MODANCE, *Examiners.*

UNITED STATES PATENT OFFICE
CERTIFICATE OF CORRECTION

Patent No. 3,183,236                                May 11, 1965

Denys Cook et al.

It is hereby certified that error appears in the above numbered patent requiring correction and that the said Letters Patent should read as corrected below.

Column 3, lines 3 to 6, the second formula should appear as shown below instead of as in the patent:

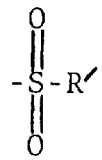

Signed and sealed this 28th day of September 1965.

(SEAL)
Attest:

ERNEST W. SWIDER                           EDWARD J. BRENNER
Attesting Officer                              Commissioner of Patents